UNITED STATES PATENT OFFICE.

WILLIAM ROTH, OF ST. LOUIS, MISSOURI, ASSIGNOR OF ONE-HALF TO EDWARD F. SPRINGMEYER, OF ST. LOUIS, MISSOURI.

POLISHING COMPOSITION.

1,426,107.  Specification of Letters Patent.  Patented Aug. 15, 1922.

No Drawing.  Application filed September 19, 1921.  Serial No. 501,733.

*To all whom it may concern:*

Be it known that I, WILLIAM ROTH, a citizen of the United States, and resident of the city of St. Louis and State of Missouri, have invented certain new and useful Improvements in Polishing Compositions, of which the following is a specification containing a full, clear, and exact description.

My invention relates to a polishing composition for use in the cleaning and polishing of furniture, pianos, automobiles, and the like.

My composition consists of turpentine, vinegar, oil, and a substance commercially known as rotten stone in powdered form.

In preparing my composition for illustration in making a gallon of the same, I take about fifty per cent (50%) or sixty-four ounces of turpentine; about twenty-five (25%) per cent or thirty-two ounces of vinegar, and heat the same to about one hundred degrees Fahrenheit; and about twenty-four per cent or thirty-one ounces of crude oil, and heat the same to about one hundred degrees Fahrenheit; and one per cent or about one ounce of a substance commercially known as rotten stone which has been pulverized to a fine powder. The turpentine, vinegar and oil are first mixed together, and to this mixture I add the rotten stone. After the composition has been prepared as above described, and is ready for use, I found it very serviceable for polishing and cleaning furniture, pianos, automobiles, etc.

Having fully described my invention, what I claim is:

A composition of matter for polishing and cleaning furniture and the like, composed of about fifty per cent of turpentine, about twenty-five per cent of vinegar, about twenty-four per cent of crude oil, and about one per cent of powdered rotten stone.

In testimony whereof, I have signed my name to this specification.

WILLIAM ROTH.